United States Patent [19]

Thompson et al.

[11] 3,843,093
[45] Oct. 22, 1974

[54] PORTABLE HOIST
[75] Inventors: James G. Thompson; Edgar M. Reynolds, both of Indialantic, Fla.
[73] Assignee: I. I Incorporated, Melbourne, Fla.
[22] Filed: Jan. 9, 1973
[21] Appl. No.: 322,227

[52] U.S. Cl............ 254/139.1, 212/59 R, 214/86 A
[51] Int. Cl. .............................................. B66c 23/60
[58] Field of Search................ 254/139.1; 214/86 A; 212/59 R

[56] References Cited
UNITED STATES PATENTS
2,720,380  10/1955  Dyer ................................ 254/139.1
2,843,360   7/1958  Proctor ........................... 254/139.1
3,111,226  11/1963  Kirsten ................................. 212/59

Primary Examiner—Richard A. Schacher
Assistant Examiner—Jeffrey V. Nase
Attorney, Agent, or Firm—Malin & Haley

[57] ABSTRACT

A portable hoist having a dual purpose of towing disabled vehicles or lifting heavy objects, the hoist mechanism being mounted on a pair of wheels and including a removeable boom. An angularly rotatably supporting frame is utilized to mount the vehicle engaging means and the removeable hoisting boom. A vehicle hitching means coupled to support frame allows the device to be towed to any desired location by a vehicle.

4 Claims, 7 Drawing Figures

PORTABLE HOIST

BACKGROUND OF THE INVENTION

This invention relates generally to the field of hoists or cranes, and more specifically to a portable hoist that is towed behind a vehicle that may be utilized to tow a disabled vehicle or as a standard hoist to lift heavy objects.

In the past, elaborate, specialized vehicles have been employed to tow disabled vehicles. The expense of these vehicles is high and they can only be utilized for lifting and towing. Applicant's invention provides a portable hoist which may be attached to any one of several different type of vehicles, such as an automobile or truck, thus eliminating the necessity of maintaining a specialized vehicle having a limited use of towing or lifting.

DESCRIPTION OF THE INVENTION

A portable hoist and combination crane for towing disabled vehicles or lifting and moving heavy objects comprising a rigid primary frame structure, a pair of wheels rotatably coupled to said primary frame structure, a pivotally mounted secondary support structure moveably coupled to and above said primary structure, a winch rigidly mounted at one end of said secondary frame, a plurality of vertically disposed, support members rigidly coupled to said secondary frame, a cross-bar, perpendicularly coupled between said vertical bars, said cross-bar having a pulley for receiving a lifting cable from the winch.

The secondary frame is horizontally disposed and has a triangularly shaped forward portion and a rectangularly shaped rear portion made up of tubular or rectangularly hollow metal segments. A center cross-member joins the sides together. The secondary frame is rotatably mounted to move angularly within its own plane relative to the primary frame structure.

A vehicle lifting means is vertically, rotatably coupled to the cross-brace of said secondary frame and allows the device to be engaged to a vehicle and to lift the wheels of the disabled vehicle off the ground. Also mounted on the secondary frame cross-bar is a flanged housing for receiving the end of a hoisting boom. The vehicle hoisting apparatus is rotated out of the way (horizontal) and a boom is inserted into the flanged housing and coupled rotatably thereto.

A pulley is rotatably mounted on top of the vertical support cross-bar and receives a cable from the winch which rides over the pulley and then is coupled to either the vehicle hoisting apparatus or to a pulley on the boom.

In either mode of operation, whether in the towing of the vehicle or in the lifting of a heavy object with the boom engaged, the winching mechanism and cable is operated in the same manner and is manually rotated.

It is an object of this invention to provide a portable hoist attachable to a vehicle, employed in towing a disabled vehicle.

Yet another object of this invention is to provide a portable hoist for the lifting of heavy objects.

Yet another object of this invention is to provide a lightweight, mobile hoist that is attachable with a standard hitch behind a truck or automobile with a standard hitch to travel with the towing vehicle to a desired location.

And still yet another object of this invention is to provide a mobile hoist that allows a conventional automobile or truck to be utilized in the towing of a disabled vehicle or the lifting of heavy objects.

In accordance with these and other objects which will be apparent hereinafter, the instant invention will now be described with particular reference to the accompanying drawings.

PREFERRED EMBODIMENT OF THE INVENTION

Figures 1, 2, 4:
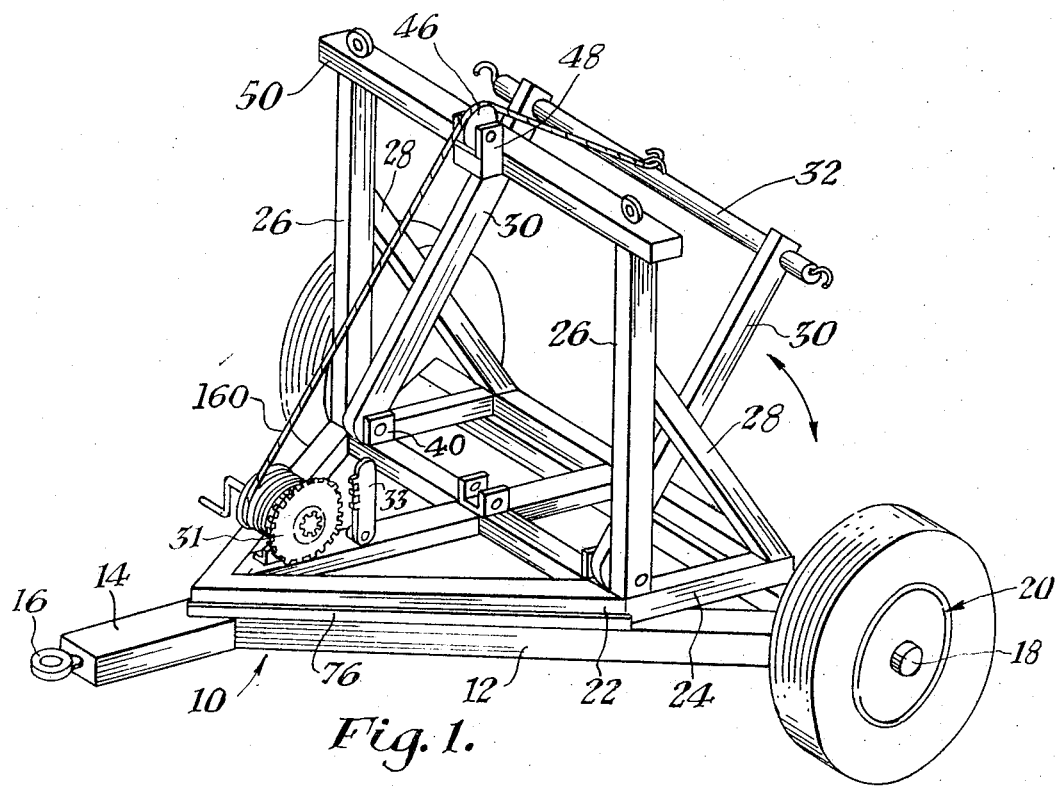
FIG. 1 shows a perspective view of Applicant's invention as utilized for towing a disabled vehicle.
FIG. 2 shows a perspective view of the primary and secondary frame structure and swiveling mechanism utilized in Applicant's invention.
FIG. 4 shows a rear perspective view of Applicant's invention including a disabled vehicle attaching mechanism, partially cutaway.

Referring now to the drawings, and especially FIG. 1, Applicant's portable hoisting device, shown generally at 10, is comprised of a pair of frame members 12 angularly jointed to a center support member 14 and are coupled at one end to a cross-support member 40. A standard hitching device 16 is coupled at one end of the middle supporting member 14 and may be attached to a vehicle in a conventional manner. At the base end of the frame is attached a wheel on each side of frame members 12 by an axle 18 and rim and tire 20 mounted on conventional wheel hub. A secondary frame is comprised of tubular members 22 angularly joined at one end and rectangular members 24 supporting the basic hoisting mechanism including the winch 31 and the wench stopping means 33 rigidly coupled at one end of the secondary supporting frame. Vertically disposed support members 26 are rigidly and perpendicularly coupled to frame members 22. A cross-brace 50 is perpendicularly and rigidly coupled to the upper ends of vertical supports 26. Mounted in the middle of cross-brace 50 is a pulley housing 48 and a pulley 46 which receives the hoisting cable 62 which is wrapped about winch 31. Auxiliary supporting braces 28 are coupled at their bottom ends to secondary frame members 24 and at their top ends rigidly to the sides of the vertical support members 26. Thus, the support members 26, 50 and 28 are rigidly coupled together and form a supporting device for lifting cable 160 as it is coupled through pulley 46.

FIG. 2 shows the relationship of the primary supporting frame having cross-members 12 and a base member 40 disposed in triangular array with a center support 14 coupled at one end to the base member 40. Positioned above the primary frame is a swivel plate 76 which is coupled between the secondary frame and the primary frame.

The secondary frame is mounted above the primary frame and the swivel plate and is comprised of two angularly disposed support members 22 coupled at one end to rectangularly disposed support members 24 which are joined together rigidly by cross-brace 36 and a center cross-brace 38. Disposed within the center braces 14 and 34 and the swivel plate are a pair of apertures. The frames are locked together by bolting means 168 and 70 with blocking nuts 72 and 74. To allow for rotation of the frame, one of the bolting means such as 168 is removed thus allowing secondary frame to angularly pivot within its plane relative to the primary frame. When both bolting means 168 and 70 are inserted through the aperatures in the center braces of the frame, the secondary frame is locked in place relative to the primary frame and will not rotate.

The apparatus utilized for lifting a disabled vehicle at one end is comprised of a pair of parallel support bars 30 rectangularly mounted at one end to the cross-brace of the secondary frame and rigidly coupled together at their opposite ends to a cross-bar 32. An eye on the cross-bar 32 receives a hook coupled to the winch line 168. Additional hooks and eyes are provided on the cross-brace 32 to engage chains which also may be coupled to the disabled vehicle for safety and for raising the disabled vehicle at one end. Movement of the winch cable 160 will move the parallel support arms 30 and cross-brace 32 in the vertical plane. The cross-brace 32 is coupled to the underside of the disabled vehicle by a pair of straps (not shown in FIG. 1) and chain devices in a conventional manner.

Figure 3:
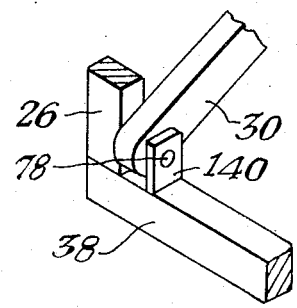
FIG. 3 shows a cutaway enlarged view of the pivoting mechanism utilized for the attachment to a disabled vehicle.

FIG. 3 shows how the arms 30 are coupled to the secondary frame with a flange 140 rigidly mounted on cross-brace 38 having an aperture for receiving a pin or the like that is coupled through to the vertical cross-brace 26. Thus, the arm 30 is free to move in a vertical direction.

FIG. 4 shows the cross-brace 32 coupled to the winch cable 160 with hook 170 received through eye 172. Each parallel strap 52 is coupled to the cross-bar 32 at one end and to a moveable bar 54 at the opposite end. The straps 52 are engaged underneath the vehicle that is disabled and is coupled to the vehicle with chains of standard length and size coupled through hooks 58 positioned at each end of the moveable cross-bar 54 in a conventional manner. Once coupled to the vehicle, the winching mechanism is reeled in, which lifts cross-bar 32 and the vehicle attached thereto. In the lifted position with the vehicle wheels at one end off the ground, the vehicle may then be towed after the winch mechanism has been locked in place. Additional chains may be attached to the rigid vertical support bar 50 through eye 56.

Figure 5A:
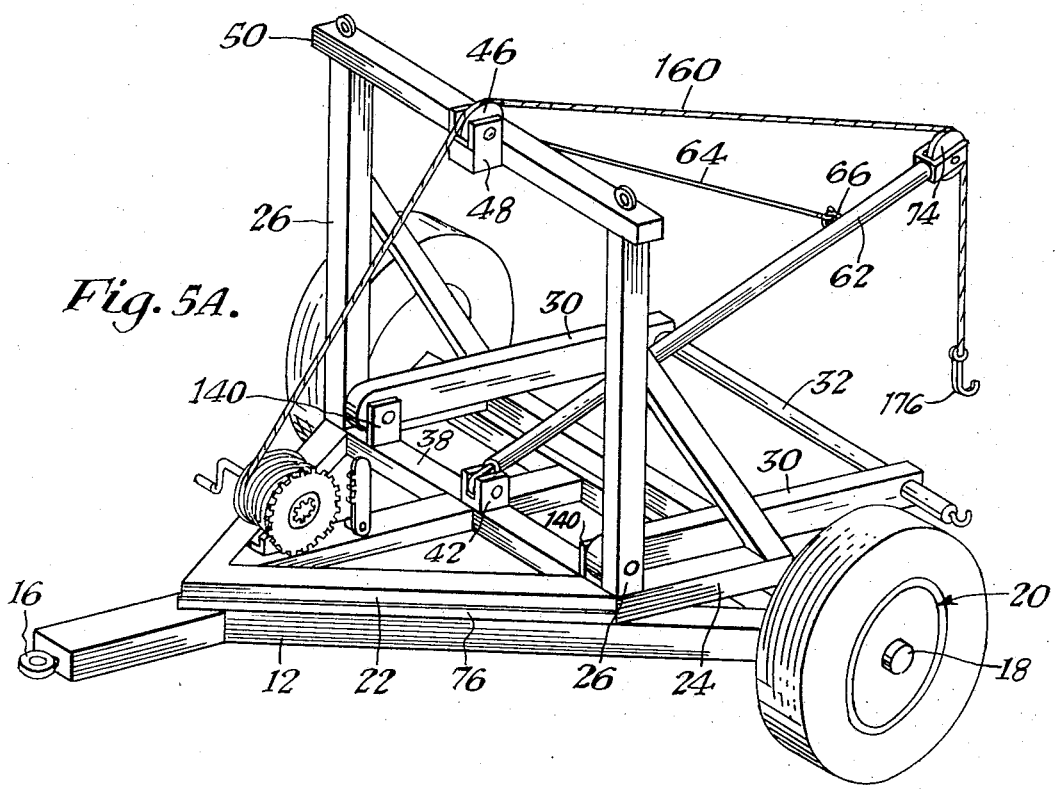
FIG. 5A shows a perspective view of a second embodiment of Applicant's invention utilizing a hoisting boom.

FIG. 5A shows an alternate embodiment in the use of Applicant's device in which the disabled vehicle mechanism with cross-bar 32 is horizontally disposed in position out of the way and laid down flat on the secondary frame. A hoisting boom 62 is rotatably engaged to housing 42 having a flanged portion and a pin for moveably attaching the secondary frame to the boom 62. A pulley 74 is rotatably coupled to the boom 62 at its free end and receives the winch cable 160. A hook 176 for lifting the heavy object is coupled to the end of winch cable 160. The angular position of the boom is achieved by coupling cable 64 to an eye 66 disposed on the boom housing 62 and coupled to an eye on the cross-brace 50. The length of the support cable 64 will determine the angular disposition of the boom 62.

Figure 5B:
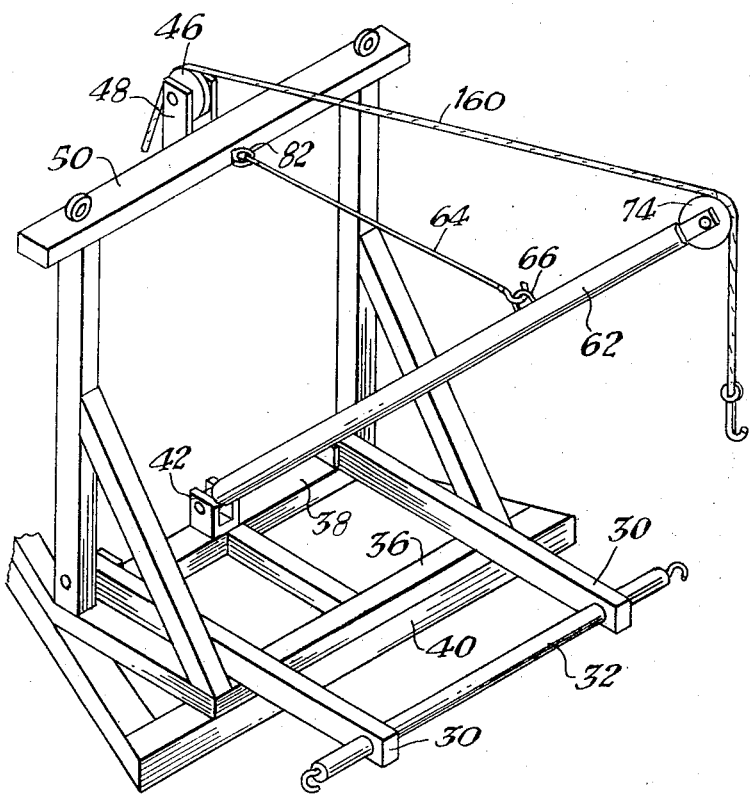
FIG. 5B shows a rear perspective view of the embodiment of Applicant's invention shown in FIG. 5A, partially cutaway.

FIG. 5B shows Applicant's alternate embodiment with the portable boom rotatably fixed to the secondary frame on cross-member 38 by flanged housing 42 having a pin through aperatures in the housing 42 and at the end of the boom. The angular distance that the boom makes with the horizontal may be adjusted by changing the length of the boom support cable 64 which is coupled through and eye 66 on the body of the boom 62 and any eye 82 which is on the side of the vertical cross-bar 50. The winching cable 160 which comes from the winch through pulley 46 is then engaged with pulley 74 at the free end of the boom. A hook or attaching device may be coupled to the end of the winch line. The attaching device which is utilized for disabled vehicles is shown in a horizontal position resting on the rear top secondary brace 36 with arm members 30 and cross-bar 32 parallel to the ground. In this position, the automobile attaching device is out of the way and one may utilize the boom for lifting of heavy objects. The secondary platform may be rotated relative to the primary platform once an object is lifted from the ground by manually pushing on the upper frame when one of the locking bolts is removed. This will allow horizontal angular movement of the boom during a lifting operation.

Figure 6:
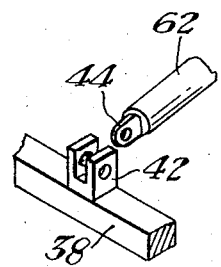
FIG. 6 shows an enlarged perspective view of the boom attaching mechanism utilized in Applicant's invention.

FIG. 6 shows the coupling of boom 62 to the secondary frame on cross-brace 38 through the flanged housing 42 having apertures therethrough and a flanged end portion 44 of the boom which protrudes axially having an aperture therethrough. The aperatures receive a locking pin or bolting means which holds the boom in place allowing it to be rotated vertically.

In operation, in one embodiment, for towing a vehicle the boom is removed and may be stored or carried with the device and not be connected to the boom housing. The automobile attaching device including the frames 30 and cross-bar 32 with the associated straps and chains is permanently attached to the device and is raised for operation by connecting the winch line and hook to an eye located on cross-bar 32 which lifts the disabled vehicle attached to the straps and chains coupled to the cross-bar 32. The disabled vehicle may then be towed by the vehicle to which the hitching device 16 is attached to the desired location. The wench is then let down and the entire device disengaged from the disabled vehicle.

In the alternate embodiment the automobile attaching device is placed in a horizontal position and the boom is inserted into the housing 42 and a locking pin applied thereto. A boom line is then coupled between the boom shank and the vertical support housing in cross-bar 50 to hold the boom in a particular angular position. The winch, on utilizing the boom, is operated in a conventional manner for lifting or lowering objects of heavy weight.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A portable hoist and disabled vehicle towing trailer comprising:

a first frame, said frame having a plurality of first frame members connected together in a common plane;

a pair of wheels, each wheel rotatably connected to said first frame;

a vehicle hitching means connected at one end to said first frame;

a second frame, said second frame having a plurality of second frame members rigidly connected together in a common plane, said second frame coupled above and adjacent to said first frame;

means to rotatably connect said second frame to said first frame;

a winch connected to one end of said second frame;

a pair of vertical support arms rigidly connected to said second frame and disposed vertically above said second frame;

a vertical cross-member connected to the upper ends rigidly to said vertical support arms;

a pulley centrally disposed and rotatably connected to said cross-members;

a pivotal support frame;

means for connecting said pivotal support frame to said second frame;

a vehicle attaching means connected to a free end of said pivotal support frame;

a boom;

means attached to said second frame for removably coupling said boom to said second frame;

means for connecting a midportion of said boom to said cross-members;

a cable connected to said winch and said pulley and engageable with said pivotal support frame.

2. A hoist and towing device, as in claim 1, including:

a removable locking means for rigidly locking said first frame to said second frame to prevent rotational movement of said second frame relative to said first frame.

3. A hoisting device, as in claim 2, wherein:

said removable lock includes a bolt and a nut receivable through said first frame and said second frame.

4. A hoist and towing device, as in claim 3, wherein:

said means to rotatably connect said second frame to said first frame includes a swivel plate disposed between said first frame and said second frame.

* * * * *